US010703990B2

(12) United States Patent
Sollberger et al.

(10) Patent No.: US 10,703,990 B2
(45) Date of Patent: Jul. 7, 2020

(54) PROCESS FOR SLURRY HYDROCRACKING USING CATALYST WITH LOW DIASPORE ALUMINA

(71) Applicant: UOP LLC, Des Plaines, IL (US)

(72) Inventors: Fred G. Sollberger, Des Plaines, IL (US); Phuong T. M. Do, Mount Prospect, IL (US); Alakananda Bhattacharyya, Glen Ellyn, IL (US); Lance A. Baird, Prospect Heights, IL (US)

(73) Assignee: UOP LLC, Des Plaines, IL (US)

( * ) Notice: Subject to any disclaimer, the term of this patent is extended or adjusted under 35 U.S.C. 154(b) by 142 days.

(21) Appl. No.: 15/685,389

(22) Filed: Aug. 24, 2017

(65) Prior Publication Data
US 2019/0062647 A1 Feb. 28, 2019

(51) Int. Cl.
*C10G 47/02* (2006.01)
*C10G 47/04* (2006.01)
*B01J 21/04* (2006.01)
*B01J 23/745* (2006.01)
*C10G 47/26* (2006.01)
*C01F 7/02* (2006.01)
*C01G 49/02* (2006.01)

(52) U.S. Cl.
CPC ............ *C10G 47/04* (2013.01); *B01J 21/04* (2013.01); *B01J 23/745* (2013.01); *C10G 47/26* (2013.01); *C01F 7/02* (2013.01); *C01G 49/02* (2013.01)

(58) Field of Classification Search
CPC .......... C10G 47/02; C10G 47/04; B01J 21/04; B01J 23/745
See application file for complete search history.

(56) References Cited

U.S. PATENT DOCUMENTS

| 2,499,675 | A | | 3/1950 | Owen | |
|---|---|---|---|---|---|
| 2,701,751 | A | * | 2/1955 | Porter | C01F 7/06 423/121 |
| 4,329,221 | A | * | 5/1982 | Farcasiu | B01J 23/34 208/214 |
| 4,655,903 | A | * | 4/1987 | Rahbe | C10G 67/0445 208/58 |
| 7,176,160 | B2 | | 2/2007 | Espinoza et al. | |
| 8,617,386 | B2 | | 12/2013 | Bhattacharyya et al. | |
| 8,709,966 | B2 | | 4/2014 | Bhattacharyya et al. | |
| 2008/0210599 | A1 | | 9/2008 | O'Connor et al. | |

OTHER PUBLICATIONS

Dzis'Ko, Effect of the preparation method and crystalline structure of the hydroxide on the catalyticactivity of aluminum oxide, Kinetika I Kataliz V7 N.3.508-11 (May-Jun. 1966), v 7, n 3, p. 508-11, May 1966; ISSN: 04538811; Publisher: Institute of Organic Chemistry; Russian Academy of Sciences.

Alexandropoulos, Bauxites as hydrotreatment catalysts, Reaction Kinetics and Catalysis Letters, v 43, n 2, p. 329-333, Apr. 1991; ISSN: 01331736, Univ of Patras, Patras, Greece.

Gan, Quantitative phase analysis of bauxites and their dissolution products, IInternational Journal of Mineral Processing 123 (2013) 64-72.

Liu, Mineralogical characteristics of the superlarge Quaternary bauxite deposits in Jingxi and Debao counties, western Guangxi, China, Journal of Asian Earth Sciences 52 (2012) 53-62.

* cited by examiner

*Primary Examiner* — Randy Boyer
(74) *Attorney, Agent, or Firm* — Paschall & Associates, LLC; James C. Paschall

(57) ABSTRACT

A process is disclosed for using an iron oxide and alumina catalyst with no more than more than about 55 wt % of the alumina in the diaspore phase or in the alpha phase in SHC. Alpha alumina is less effective catalyst component for slurry hydrocracking in terms of TIOR conversion. Drying procedures should avoid more than about 51 wt % of the alumina change to the alpha phase. The SHC catalyst is for converting heavy hydrocarbon feed into lighter hydrocarbon products.

5 Claims, No Drawings

PROCESS FOR SLURRY HYDROCRACKING USING CATALYST WITH LOW DIASPORE ALUMINA

BACKGROUND

The field relates to a process for the treatment of crude oils and, more particularly, to the hydroconversion of heavy hydrocarbons in the presence of catalysts to provide useable products and further prepare feedstock for further refining.

As the reserves of conventional crude oils decline, heavy oils must be upgraded to meet world demand for transportation fuel. In heavy oil upgrading, heavier materials are converted to lighter fractions and most of the sulfur, nitrogen and metals must be removed. Heavy oils contain a large proportion of material boiling above 524° C. (or 975° F.) or higher. These heavy hydrocarbon feedstocks may be characterized by low reactivity in visbreaking, high coking tendency, poor susceptibility to hydrocracking and difficulties in distillation. Most residual oil feedstocks which are to be upgraded contain some level of asphaltenes which are typically understood to be high molecular weight compounds that are insoluble in heptane but soluble in toluene as determined by ASTM D3279 or ASTM D6560. A slurry hydrocracking (SHC) process has been found to provide high liquid yields with much reduced coke formation through the use of catalyst particles.

In SHC, a three-phase mixture of heavy liquid oil feed cracks in the presence of gaseous hydrogen over solid catalyst to produce lighter products under pressure at elevated temperature. Iron sulfate monohydrate (ISM) is a conventional SHC catalyst. ISM is sulfided in the reactor to the active phase, pyrrhotite.

Bauxite and laterite have been disclosed as effective SHC catalysts. These naturally occurring minerals may be ground down to smaller size for better dispersion and facilitation of mass transfer. The iron contained in the bauxite or laterite is an effective SHC catalyst when in sulfide form as pyrrhotite.

Toluene can be used as a solvent to dissolve and separate carbonaceous solids from lighter hydrocarbons in the SHC product. The solids not dissolved by toluene include catalyst and toluene insoluble organic residue (TIOR). TIOR includes coke and mesophase and is heavier and less soluble than asphaltenes. Mesophase formation is a critical reaction constraint in slurry hydrocracking reactions. Mesophase is a semi-crystalline carbonaceous material defined as round, anisotropic particles present in pitch boiling above 524° C. The presence of mesophase can serve as a warning that operating conditions are too severe in an SHC reactor and that coke formation is likely to occur under prevailing conditions.

As the number and volume of SHC operations to upgrade heavy oil increase, greater supplies of effective SHC catalyst will become necessary. Since ISM is continuously added to the process and lost in the unconverted pitch, there is a need for more active catalyst materials which can be added at lower concentrations while delivering comparable hydrogenation and mesophase suppression compared to ISM.

SUMMARY

We have found that diaspore alumina is less effective catalyst component for slurry hydrocracking in terms of TIOR conversion. Measures should be taken to avoid using iron oxide and alumina minerals with more than about 55 wt % of the alumina in the diaspore phase or converting alumina in iron oxide and alumina minerals into more than about 51 wt % of the alpha phase to maintain effectiveness of the SHC catalyst. Drying procedures should avoid alumina changing to more than about 51 wt % alpha phase.

Definitions

The term "communication" means that material flow is operatively permitted between enumerated components.

The term "downstream communication" means that at least a portion of material flowing to the subject in downstream communication may operatively flow from the object with which it communicates.

The term "upstream communication" means that at least a portion of the material flowing from the subject in upstream communication may operatively flow to the object with which it communicates.

The term "column" means a distillation column or columns for separating one or more components of different volatilities. Unless otherwise indicated, each column includes a condenser on an overhead of the column to condense and reflux a portion of an overhead stream back to the top of the column and a reboiler at a bottom of the column to vaporize and send a portion of a bottoms stream back to the bottom of the column. Feeds to the columns may be preheated. The top pressure is the pressure of the overhead vapor at the vapor outlet of the column. The bottom temperature is the liquid bottom outlet temperature. Overhead lines and bottoms lines refer to the net lines from the column downstream of any reflux or reboil to the column. Stripping columns may omit a reboiler at a bottom of the column and instead provide heating requirements and separation impetus from an inert fluid such as steam. Stripping columns typically feed a top tray and take main product from the bottom.

As used herein, the term "boiling point temperature" means atmospheric equivalent boiling point (AEBP) as calculated from the observed boiling temperature and the distillation pressure, as calculated using the equations furnished in ASTM D1160 appendix A7 entitled "Practice for Converting Observed Vapor Temperatures to Atmospheric Equivalent Temperatures".

As used herein, the term "True Boiling Point" (TBP) means a test method for determining the boiling point of a material which corresponds to ASTM D-2892 for the production of a liquefied gas, distillate fractions, and residuum of standardized quality on which analytical data can be obtained, and the determination of yields of the above fractions by both mass and volume from which a graph of temperature versus mass % distilled is produced using fifteen theoretical plates in a column with a 5:1 reflux ratio.

As used herein, "pitch" means the hydrocarbon material boiling above 524° C. (975° F.) AEBP as determined by any standard gas chromatographic simulated distillation method such as ASTM D2887, D6352 or D7169, all of which are used by the petroleum industry.

As used herein, the term "T5" or "T95" means the temperature at which 5 volume percent or 95 volume percent, as the case may be, respectively, of the sample boils using ASTM D-86.

As used herein, the term "initial boiling point" (IBP) means the temperature at which the sample begins to boil using ASTM D-86.

As used herein, the term "end point" (EP) means the temperature at which the sample has all boiled off using ASTM D-86.

As used herein, the term "diesel boiling range" means hydrocarbons boiling in the range of between 204 °C (399° F.) and 343 °C (650 °F) using the TBP distillation method.

As used herein, the term "diesel conversion" means conversion of feed that boils above the diesel cut point to material that boils at or below the diesel cut point in the diesel boiling range.

As used herein, "pitch conversion" means the conversion of materials boiling above 524° C. (975° F.) converting to material boiling at or below 524° C. (975° F.).

As used herein, "vacuum gas oil" means the hydrocarbon material boiling in the range between 343° C. (650° F.) and 524° C. (975° F.) AEBP as determined by any standard gas chromatographic simulated distillation method such as ASTM D2887, D6352 or D7169, all of which are used by the petroleum industry.

As used herein, the term "separator" means a vessel which has an inlet and at least an overhead vapor outlet and a bottoms liquid outlet and may also have an aqueous stream outlet from a boot. A flash drum is a type of separator which may be in downstream communication with a separator that may be operated at higher pressure.

As used herein, the term "predominant" or "predominate" means greater than 50%, suitably greater than 75% and preferably greater than 90%.

As used herein, solvent "insolubles" means materials not dissolving in the solvent named.

DESCRIPTION

Iron oxide and alumina mineral catalysts are effective for SHC. The mineral catalyst particles are mixed with a heavy hydrocarbon liquid feed and hydrogen to form a heavy hydrocarbon slurry comprising hydrocarbon liquid, hydrogen and catalyst particles. The heavy hydrocarbons in the slurry crack in the presence of the hydrogen and the catalyst particles in a SHC reactor to produce a hydrocracked slurry product comprising lighter hydrocarbon products.

Typical iron oxide and alumina minerals include laterite and bauxite. Red mud which is alumina-depleted bauxite may also be used as a SHC catalyst. While it has been shown that the iron oxides and hydroxides present in bauxite and laterite undergo sulfidation to pyrrhotite during SHC to form the active hydrogenation catalyst, some bauxite and laterite samples with high iron content do not provide sufficient SHC activity. XRD estimation of the average hematite, $Fe_2O_3$, crystallite size indicates that the dispersion of iron oxide is not much different between good and poor performing bauxite samples. We have found that dried iron oxide and alumina minerals with alumina in the alpha phase are less effective SHC catalysts than those with alumina in other phases, such as chi or gamma. Alpha alumina is a phase of low surface area which causes poor activity for slurry hydrocracking.

Effective minerals for SHC catalyst comprise between about 2 and about 80 wt-% iron oxide and between about 20 and about 98 wt-% alumina. Alumina may be naturally present in iron oxide and alumina minerals typically in the form of boehmite, gibbsite or diaspore. Alumina can be provided in the catalyst by derivatives such as spinels and perovskites. The alumina in the mineral particles may comprise between about 20 and about 98 wt %, typically no more than about 95 wt %, of the particle and preferably between about 50 to about 84 wt % of the particle.

We have determined that iron oxide and alumina minerals can be effective SHC catalysts, so long as no more than about 51 wt % of the alumina in the particles are in the alpha phase. We have found that 3 wt % ISM in the heavy hydrocarbon feed to the SHC reactor can provide at least about 80 wt % pitch conversion and a TIOR yield of no more than about 3.1 wt %. We concluded that 1.5 wt % of an iron oxide and alumina mineral with no more than about 55 wt % of alumina in the alpha phase can also provide at least about 80 wt % pitch conversion and a TIOR yield of no more than about 3.1 wt %.

The most common naturally occurring alumina phases in minerals are boehmite, gibbsite and diaspore. Gibbsite has the formula $Al(OH)_3$. Gibbsite can partially dehydrate to boehmite or completely dehydrate to chi alumina at less than about 275° C. Chi alumina can transition to kappa and then alpha, but the transition to alpha will not occur under about 1000° C. Boehmite has the formula AlO(OH) with much of the water being in an amorphous phase. Boehmite can transition to gamma alumina at about 300 to about 500° C. Gamma alumina can then transition into the delta, theta and alpha phases in sequence, but will not transition to alpha at less than about 1000° C. Diaspore alumina has the formula AlO(OH) but unlike boehmite, the water is in a crystalline phase. Diaspore transitions into alpha alumina at a relatively low temperature of between about 400 and about 500° C.

We have found that dehydrated iron oxide and alumina minerals are also more effective SHC catalysts and are preferably dried before they are mixed with heavy hydrocarbon liquid feed. The alumina in the iron oxide and alumina catalyst particles should comprise less than 15 wt % water and preferably less than 10 wt % water typically after some level of drying. If the iron oxide and alumina mineral particles are heat treated to provide the alumina in the chi and/or gamma phases, the iron oxide and alumina mineral particles may have less than 1 wt % water. Dried alumina typically transitions into the gamma or chi phase which has a higher surface area than before drying thereby increasing the catalytic activity of the mineral. Drying also facilitates grinding to finer particles and removing water concentrates the catalytically active components in the mineral particles which improves transportability and reduces required catalyst addition rate.

Drying can effected by heat treatment to remove water and other volatiles from the mineral. Volatiles may be removed by vaporization from the mineral particle in their unconverted state. Some volatiles may be generated by chemical reaction of non-volatile components of the mineral which may be energized by heating to produce volatiles that can be subsequently vaporized. Heat treatment can also effect a phase transfer of the alumina to other phases. Heat treating can include calcination, roasting, drying, dehydration and any process which heats the mineral particles to elevated temperatures, preferably above 150° C. In an aspect, the heat treating is effected by streaming a gas such as air over the iron oxide and alumina mineral particles in an oven heated to the target temperature for sufficient time such as 2-50 hours for the minerals to reach the target heat treating temperature.

Providing iron oxide and alumina particles with no more than about 51 wt % of the alumina in the particles in the alpha phase can be achieved by ensuring that the mineral particles have no more than about 55 wt % of the alumina in the diaspore phase. The iron oxide and alumina particles may have at least about 0.5 wt % of the alumina in the diaspore phase. Suitably, the iron oxide and alumina particles may have at least about 1 wt % or at least about 5 wt % of the alumina in the diaspore phase. The alumina in the iron oxide and alumina catalyst particles may comprise at least about 40 wt %, preferably at least about 45 wt %, gibbsite alumina and/or boehmite alumina in the aggregate. If iron oxide and alumina particles with no more than about 55 wt % of the alumina in the mineral particles in the diaspore phase or at least about 40 wt %, preferably at least about 45 wt %, gibbsite alumina and/or boehmite alumina in the aggregate, are heat treated at no more than about 1000° C., preferably no more than about 800° C., such as between about 150 to about 800° C., insufficient alumina in the iron oxide and alumina particles will convert to the alpha phase to provide no more than about 51 wt % alpha phase alumina. This assumes all of the diaspore converts to the alpha phase because gibbsite and boehmite will not convert to the alpha phase in this temperature range. The remaining alumina in the iron oxide and alumina mineral particle not in the diaspore phase will typically be in the gibbsite or boehmite phase.

If iron oxide and alumina particles with no more than about 55 wt % of the alumina in the mineral particles in the diaspore phase or at least about 40 wt %, preferably at least about 45 wt %, gibbsite alumina and/or boehmite alumina in the aggregate are heat treated at no more than about 600° C., such as between about 150 to about 600° C., insufficient alumina in the iron oxide and alumina particles will convert to the alpha phase to provide no more than about 51 wt % alpha phase alumina. This is a result of all of the gibbsite converting to boehmite or chi phases and all of the boehmite converting to the gamma phase leaving insufficient diaspore to convert to the alpha phase. Alumina in the chi and gamma phases are catalytically active for SHC. Preferably, at least about 45 wt % of the alumina in the iron oxide and alumina particles are in the chi and/or gamma phases after heat treating and preferably at least about 49 wt % of the alumina in the iron oxide and alumina particles are in the chi and/or gamma phases after heat treating.

If the iron oxide and alumina particles comprise more than about 55 wt % of the alumina in the diaspore phase it should be dried at no more than about 500° C., preferably no more than 450° C., more preferably no more than about 400° C., such as between about 150 and about 450° C. or such as between about 150 and about 400° C. to avoid transition of the diaspore alumina phase into the alpha phase to provide particles with over 51 wt % of the alumina in the alpha phase.

Iron oxide and alumina minerals preferably comprise a gibbsite or a boehmite alumina phase before heat treating. The iron oxide and alumina mineral particles may have at least about 25 wt %, suitably at least about 35 wt %, preferably at least about 40 wt %, most preferably at least about 45 wt % and more suitably at least about 50 wt %, of the alumina is in the gibbsite phase or the boehmite phase before heat treating. Gibbsite and boehmite alumina phases will not convert into the alpha alumina phase during heat treating to elevated temperatures of 1000° C. and suitably 800° C.

The iron oxide and alumina mineral particles comprise typically at least about 2, more typically at least about 3, suitably at least about 5 and preferably at least about 10 wt % iron oxide. The iron oxide and alumina mineral particle typically does not exceed about 80 wt % iron oxide, and preferably comprises between about 10 and about 45 wt % iron oxide. The iron oxide may be hematite, $Fe_2O_3$, or magnetite, $Fe_3O_4$ and may also be in a hydrated form before heat treating.

The iron oxide and alumina particles should comprise no more than about 30 wt % diaspore before heat treatment. Moreover, no more than about 26 wt % of the iron oxide and alumina particles should be in the alpha phase after heat treatment.

Thermogravimetric analysis can be used to quantify the weight fraction of hydrated aluminas such as diaspore, gibbsite and boehmite in an iron oxide and alumina particle by sample weight loss at specified peak positions at standard conditions as indicated in Foldvari, HANDBOOK OF THERMO-GRAVIMETRIC SYSTEM OF MINERALS AND ITS USE IN GEOLOGICAL PRACTICE (Budapest, 2011). X-ray diffraction quantitative phase analysis using Rietveld refinement can be used to quantify weight fractions of alumina phases of heat treated iron oxide and alumina particles according to B. Gan, INT'L JOURNAL MIN. PROC. 123, p. 64-72 (2013).

Bauxite is a preferred bulk available mineral having these proportions. Bauxite typically has about 10 to about 40 wt % iron oxide, $Fe_2O_3$, and about 54 to about 84 wt % alumina and may have about 10 to about 35 wt % iron oxide and about 55 to about 80 wt % alumina. Bauxite also may comprise silica, $SiO_2$, and titania, $TiO_2$, in aggregate amounts of usually no more than about 10 wt % and typically in aggregate amounts of no more than about 6 wt %. Suitable bauxite is available from Saint-Gobain Proppants in Fort Smith, Ark.

Laterite is another suitable iron oxide and alumina mineral for a SHC catalyst.

The best iron oxide and alumina minerals do not include clay such as kaolinite. Suitably the iron oxide and alumina mineral comprises no more than about 10 wt % clay and preferably no more than about 5 wt % clay.

Red mud which comprises bauxite with much of the alumina extracted will have a larger proportion of iron and a lower proportion of alumina such as about 3 to about 30 wt % alumina and preferably about 25 to about 90 wt-% iron oxide and preferably between about 35 and about 60 wt % iron oxide. Calcium oxide may be present in red mud in about 1 to about 40 wt % and preferably between about 1 to about 10 wt %. A preferred red mud has a small proportion of micropores that have largest diameters smaller than about 75 angstroms such as under about 10% and preferably under about 5% of their largest diameters smaller than about 75 angstroms.

Volatiles such as water and carbon dioxide are also present in bulk available minerals, but the foregoing weight proportions herein exclude the volatiles.

It is also preferred that the iron oxide and alumina mineral particles not be impregnated with other metals such as molybdenum. However, the iron oxide and alumina mineral particles may be mixed with other SHC catalyst components such as molybdenum or carbon.

We have found that iron oxide and alumina minerals are most effective SHC catalysts after they are preferably ground down to smaller particle size before being mixed with the heavy hydrocarbon liquid feed for better dispersion and facilitation of mass transfer. Minerals may be ground in a hammer mill, jet mill, ball mill or similar machinery to have an average particle diameter of between about 1and about 50 microns. A suitable average particle diameter is between about 1 and about 27 microns. A preferred average particle diameter is between about 14 and about 19 microns.

The process is capable of converting a wide range of heavy hydrocarbon feedstocks into lighter hydrocarbon products. It can process aromatic feedstocks, as well as feedstocks which have traditionally been very difficult to hydroprocess, e.g. atmospheric or vacuum residue, visbroken residue, deasphalted bottom materials, off-specification asphalt, sediment from the bottom of oil storage tanks, tar sands, bitumen, etc. Suitable feeds include atmospheric residue with an IBP above or at 650° F. (343° C.), heavy vacuum gas oil (VGO) with an IBP above or at 800° F. (426° C.) and vacuum residue with an IBP above or at 950° F. (510° C.). Feeds with a T90 greater than or equal to 572° F. (300° C.) may be suitable. Suitable feeds include an API gravity of no more than 20 degrees, typically no more than 10 degrees and may include feeds with less than 5 degrees.

In the exemplary SHC process a heavy hydrocarbon oil feed, an optional recycle pitch stream containing catalyst particles and an optional recycled heavy VGO (HVGO) in may be combined and heated before being pumped into an inlet in a bottom of a tubular SHC reactor, known as a bubble column. Solid mineral particles of iron oxide and alumina catalyst may be added directly to the heavy hydrocarbon oil feed in the SHC reactor or may be mixed with a heavy hydrocarbon oil feed before entering the reactor to provide a slurry in the reactor. Recycled hydrogen and/or make up hydrogen are fed into the SHC reactor after heating. Both hydrocarbon oil feed and hydrogen may be distributed in the SHC reactor with an appropriate distributor. Preferably the recycled pitch stream makes up about 0 to about 25 wt % of the feedstock to the SHC reactor, while the HVGO makes up about 0 to about 20 wt % of the feedstock, depending upon the quality of the feedstock and the once-through conversion level. The feed entering the SHC reactor comprises three phases, solid catalyst particles, liquid hydrocarbon feed, which may include solid hydrocarbon in the recycled pitch, and gaseous hydrogen and hydrocarbon.

The process can be operated at quite moderate pressure, in the range of about 3.5 MPa (500 psig) to about 24 MPa (3500 psig) and preferably in the range of about 10.3 MPa (1500 psig) to about 19.3 MPa (2800 psig), without coke formation in the SHC reactor with the appropriate catalyst. The reactor temperature is typically in the range of about 400 to about 500° C. with a temperature of about 440 to about 465° C. being suitable and a range of about 425 to about 460° C. being preferred. The LHSV is typically below about 4 h$^{-1}$ on a fresh feed basis, with a range of about 0.05 to about 1.5 h$^{-1}$ being preferred and a range of about 0.3 to about 1 h$^{-1}$ being particularly preferred. Although SHC can be carried out in a variety of known reactors of either up or down flow, it is particularly well suited to a bubble column reactor through which feed, catalyst and gas move upwardly. Hence, the outlet from SHC reactor is above the inlet. One or more SHC reactors may be utilized in parallel or in series. Because the liquid feed is converted to vaporous product, foaming tends to occur in the SHC reactor. An antifoaming agent may also be added to the SHC reactor, preferably to the top thereof, to reduce the tendency to generate foam.

A hydrocracked slurry product which may comprise gas-liquid mixture is withdrawn from a top of the SHC reactor. The hydrocracked slurry product may be separated and cooled through a series of separators, stripped of hydrogen sulfide and other gases in a product stripper and fractionated in an atmospheric fractionation column and a vacuum column to provide product streams. The product fractionator produces a light gas stream recovered in an overhead line, a naphtha product stream from a fractionator overhead receiver bottoms, a diesel stream, a light VGO stream, a heavy VGO stream and a pitch stream from a column bottom. The heavy VGO stream may be recycled to the SHC reactor because its high aromaticity may reduce coking tendencies in the reactor. At least some of the pitch stream may also be recycled to the SHC reactor.

The activated iron sulfide in the iron oxide and alumina catalyst particles has several molecular forms, so is generally represented by the formula, $Fe_xS$, where x is between 0.7 and 1.3. We have found that essentially all of the iron oxide in an iron oxide and alumina particle such as bauxite converts to iron sulfide upon heating the mixture of hydrocarbon and catalyst to about 410° C. in the presence of hydrogen and sulfur. In this context, "essentially all" means no peak for iron oxide is generated on an XRD plot of intensity vs. two theta degrees at 33.1 two theta degrees or no less than 99 wt % conversion to iron sulfide. Sulfur may be present in the hydrocarbon feed as organic sulfur compounds. Consequently, the iron in the mineral particle may be added to the heavy hydrocarbon feed in the +3 oxidation state, preferably as $Fe_2O_3$.

EXAMPLES

Example 1

An Urals vacuum resid having a characterization in Table 1 was used to test the catalyst.

TABLE 1

| | |
|---|---|
| Density, g/cm$^3$ | 1.013 |
| Sulfur, wt % | 2.89 |
| Carbon, wt % | 83.1 |
| Hydrogen, wt % | 10.2 |
| Nitrogen, wt % | 0.34 |
| Heptane Insolubles, wt % | 5.78 |
| Carbon Residue, wt % | 17.9 |
| Pentane Insolubles, wt % | 10 |
| Toluene Insolubles, wt % | 0.4 |

Testing was conducted to examine activity of the catalysts. To measure catalyst activity, a pilot plant 1 liter stirred tank autoclave reactor was run in a batch manner. In a standard activity test to measure activity of conventional iron sulfate monohydrate (ISM) catalyst, the reactor was charged with 500 g of Urals vacuum residue, 2.5 g sulfur powder, and 15 g ISM such that the catalyst was 3.0 wt % of fresh residue feed. For measuring activity of iron oxide and alumina catalysts, the reactor was charged with 500 g of Urals vacuum residue, 2.5 g sulfur powder, and 7.5 g bauxite such that the catalyst was 1.5 wt % of fresh residue feed.

The batch tests were performed by first pressurizing the reactor to 14 MPa (gauge) (2000 psig) with pure hydrogen stirred at 1000 rpm. The reactor was then rapidly heated to 450° C. in 15 minutes and then kept at temperature for 120 minutes, before cooling rapidly and depressurizing. Hydrogen remained flowing into the reactor through a sparger submerged in the liquid at a rate of 6.52 standard liters per minute during the test, which carried lighter cracked components out of the reactor into a room temperature knockout pot trap and chilled knockout pot trap operated at 4° C. downstream for collection. TIOR yield was calculated as the difference between toluene insoluble solids and the ash content of the product liquid. Conversion was calculated by subtracting the fraction of unconverted feed to total feed from unity. Unconverted feed is defined as the sum of TIOR solids and the portion of the reactor liquid product which boiled above 524° C. (975° F.).

The toluene insoluble organic residue yield (TIOR) for the standard activity test of the resid feed with 3.0 wt % ISM catalyst concentration is 3.1 wt %. Bauxite loaded at 1.5 wt % in residue feed results in roughly the same ash concentration in pitch due to ISM losing half its weight as ISM is converted to an active catalyst form in the reactor. More bauxite added would lower TIOR yield, but results in higher ash in the pitch product, which quickly becomes unacceptable for process economics.

Bauxite samples tested, characteristics and results are shown in Table 2.

TABLE 2

| Sample | A | 2-916 | 2-953 | 2-925 |
|---|---|---|---|---|
| Source Material | North American Bauxite | Chinese bauxite | Chinese bauxite | Chinese bauxite |
| Pretreatment | Dried and sized by vendor | Sized by vendor and dried at 200° C. for 48 hrs. | Sized by vendor and dried at 400° C. for 48 hrs. | Sized by vendor and dried at 450° C. for 48 hrs. |
| Loss on ignition (LOI) at 900° C., wt % | 9.3 | 9.6 | 8.7 | 6.1 |
| Al, wt % | 28.45 | 25.24 | 25.49 | 26.21 |
| Fe, wt % | 15.95 | 17.54 | 17.71 | 18.22 |
| Si, wt % | 1.72 | 6.01 | 6.20 | 6.44 |
| Ti, wt % | 1.79 | 1.29 | 1.35 | 1.38 |
| Alumina phases and materials | γ-alumina | diaspore, chamosite-clinochlore | α-alumina, diaspore, chamosite-clinochlore | α-alumina, diaspore, chamosite-clinochlore |
| Other minerals | hematite, anatase | hematite, quartz | hematite, quartz | hematite, quartz |
| Particle Size Distribution (PSD), μm (d10/50/90) | 1.5/6.4/12.5 | 0.7/2.4/7.5 | 0.7/2.4/7.5 | 0.7/2.4/7.5 |
| Conversion of 524° C.+, % | 85.7 | 80.4 | 81.3 | 83.0 |
| TIOR Yield, % | 2.4 | 6.2 | 3.7 | 4.0 |

Determining the maximum acceptable diaspore content in a naturally occurring mineral is not feasible, because there is no way to synthesize a natural mineral and get a meaningful result. Hence, we calculated how much diaspore can be present in a mineral mixture if one of the minerals also contained non-diaspore alumina without allowing higher than acceptable TIOR yield. Using the highest activity diaspore-containing bauxite we found, Sample 2-953, which yields 3.7 wt % TIOR and the highest activity bauxite without diaspore or alpha alumina, Sample A, which yields 2.4 wt % TIOR, a mixture of 53.8 wt % diaspore-containing bauxite of Sample 2-953 and 46.2 wt % bauxite without diaspore or alpha alumina is expected to provide 3.1 wt % TIOR yield which provides equivalent TIOR yield for the conventional ISM catalyst at higher concentration:

$$2.4x + 3.7(1-x) = 3.1 \quad (1)$$

wherein x=the weight fraction of the bauxite without diaspore or alpha alumina.

Gamma alumina is expected to be a more active alumina phase for SHC catalyst than gibbsite or boehmite due to its higher surface area and lower water content. Additionally, removing volatile matter from a catalyst makes it more active on a weight basis even assuming no positive effect on the activity from iron.

According to Table 2, Sample 2-953 containing diaspore, comprising 53.8 wt % of the blended bauxite material contains 25.49 wt % aluminum, corresponding to at most 56.67 wt % diaspore (AlOOH) assuming all of the alumina in the Sample 2-953 is in the diaspore phase. Hence, the total blended material would comprise 30.49 wt % diaspore:

$$53.8 \text{ wt \%} * 56.67 \text{ wt \%} = 30.49 \text{ wt \%} \quad (2)$$

If all of the diaspore in Sample 2-953 were converted to alpha phase it would comprise 48.16 alpha alumina ($Al_2O_3$).

Sample A, containing no diaspore, comprising 46.2 wt % of the blended bauxite material contains 28.45 wt % aluminum, corresponding to 53.76 wt % gamma alumina ($Al_2O_3$). Hence, the total blended material would comprise 24.84 wt % gamma alumina:

$$46.2 \text{ wt \%} * 53.76 \text{ wt \%} = 24.84 \text{ wt \%} \quad (3)$$

A diaspore content of a hypothetical blend material is thus 30.49 wt % and the diaspore content of the alumina portion of the hypothetical blend is 55.11 wt %:

$$30.49 \text{ wt \%}/(30.49 \text{ wt \%} + 24.84 \text{ wt \%}) = 55.11 \text{ wt \%} \quad (4)$$

If all of the diaspore in the hypothetical blend material is heat treated and converted to the alpha phase 25.91 wt % of the total blend material would be in the alpha phase:

$$53.8 \text{ wt \%} * 48.16 \text{ wt \%} = 25.91 \text{ wt \%} \quad (5)$$

Moreover, 51.05 wt % of the alumina in the blend material would be in the alpha phase:

$$25.91 \text{ wt \%}/(25.91 \text{ wt \%} + 24.84 \text{ wt \%}) = 51.05 \text{ wt \%} \quad (6)$$

SPECIFIC EMBODIMENTS

While the following is described in conjunction with specific embodiments, it will be understood that this description is intended to illustrate and not limit the scope of the preceding description and the appended claims.

A first embodiment of the invention is a process for converting heavy hydrocarbon feed into lighter hydrocarbon products comprising providing catalyst particles comprising iron oxide and alumina, the alumina comprising no more than about 55 wt % diaspore and the alumina comprising less than about 15 wt % water; mixing the heavy hydrocarbon liquid feed with hydrogen and the catalyst particles to form a heavy hydrocarbon slurry comprising hydrocarbon liquid and catalyst particles; hydrocracking hydrocarbons in the heavy hydrocarbon slurry in the presence of the hydrogen and the catalyst particles in a hydrocracking reactor to produce a hydrocracked slurry product comprising lighter hydrocarbon products; and withdrawing the hydrocracked slurry product from the hydrocracking reactor. An embodiment of the invention is one, any or all of prior embodiments in this paragraph up through the first embodiment in this paragraph further comprising heat treating the catalyst particles prior to mixing with the heavy hydrocarbon liquid. An embodiment of the invention is one, any or all of prior embodiments in this paragraph up through the first embodiment in this paragraph further wherein the alumina in the catalyst particle comprises less than about 10 wt % water. An embodiment of the invention is one, any or all of prior embodiments in this paragraph up through the first embodiment in this paragraph further comprising heat treating the catalyst particles at a temperature between about 150 and about 800° C. An embodiment of the invention is one, any or all of prior embodiments in this paragraph up through the first embodiment in this paragraph wherein the alumina in the catalyst particles comprise at least about 40 wt % of gibbsite alumina and/or boehmite alumina. An embodiment of the invention is one, any or all of prior embodiments in this paragraph up through the first embodiment in this paragraph further comprising heat treating the catalyst particles at a temperature between about 150 and about 600° C. An embodiment of the invention is one, any or all of prior embodiments in this paragraph up through the first embodiment in this paragraph wherein the alumina in the catalyst particles comprise at least about 0.5 wt % diaspore alumina.

A second embodiment of the invention is a process for converting heavy hydrocarbon feed into lighter hydrocarbon products comprising heat treating catalyst particles comprising iron oxide and alumina to provide dried catalyst particles comprising no more than about 51 wt % of the alumina in the alpha phase; mixing the heavy hydrocarbon liquid feed with hydrogen and the dried catalyst particles to form a heavy hydrocarbon slurry comprising hydrocarbon liquid and catalyst particles; hydrocracking hydrocarbons in the heavy hydrocarbon slurry in the presence of the hydrogen and the catalyst particles in a hydrocracking reactor to produce a hydrocracked slurry product comprising lighter hydrocarbon products; and withdrawing the hydrocracked slurry product from the hydrocracking reactor. An embodiment of the invention is one, any or all of prior embodiments in this paragraph up through the second embodiment in this paragraph wherein the catalyst particles comprise no more than about 55 wt % alumina in the diaspore phase before heat treating. An embodiment of the invention is one, any or all of prior embodiments in this paragraph up through the second embodiment in this paragraph further comprising heat treating the catalyst particles at a temperature of between about 150 and about 800° C. to provide dried catalyst particles. An embodiment of the invention is one, any or all of prior embodiments in this paragraph up through the second embodiment in this paragraph wherein the catalyst particles comprise no more than about 30 wt % of the alumina in the diaspore phase before heat treating. An embodiment of the invention is one, any or all of prior embodiments in this paragraph up through the second embodiment in this paragraph further comprising heat treating the catalyst particles at a temperature of between about 150 and about 400° C. An embodiment of the invention is one, any or all of prior embodiments in this paragraph up through the second embodiment in this paragraph wherein the catalyst particles comprise at least about 40 wt % of the alumina in the gibbsite and/or boehmite phase before heat treating. An embodiment of the invention is one, any or all of prior embodiments in this paragraph up through the second embodiment in this paragraph further comprising heat treating the catalyst particles at a temperature of between about 150 and about 600° C. An embodiment of the invention is one, any or all of prior embodiments in this paragraph up through the second embodiment in this paragraph wherein in the catalyst particles comprise at least about 40 wt % of the alumina in the chi and/or gamma phase after heat treating.

A third embodiment of the invention is a process for converting heavy hydrocarbon feed into lighter hydrocarbon products comprising mixing the heavy hydrocarbon liquid feed with hydrogen and catalyst particles comprising iron oxide and alumina to form a heavy hydrocarbon slurry comprising hydrocarbon liquid and catalyst particles, the alumina comprising no more than about 55 wt % diaspore alumina and at least about 40 wt % gibbsite and/or boehmite alumina; hydrocracking hydrocarbons in the heavy hydrocarbon slurry in the presence of the hydrogen and the catalyst particles in a hydrocracking reactor to produce a hydrocracked slurry product comprising lighter hydrocarbon products; and withdrawing the hydrocracked slurry product from the hydrocracking reactor. An embodiment of the invention is one, any or all of prior embodiments in this paragraph up through the third embodiment in this paragraph wherein the alumina in the catalyst particles comprise at least 0.5 wt % diaspore alumina. An embodiment of the invention is one, any or all of prior embodiments in this paragraph up through the third embodiment in this paragraph further comprising heat treating the catalyst particles at a temperature of no more than about 600° C. An embodiment of the invention is one, any or all of prior embodiments in this paragraph up through the third embodiment in this paragraph wherein the dried catalyst particles comprise no more than about 55 wt % alpha alumina. An embodiment of the invention is one, any or all of prior embodiments in this paragraph up through the third embodiment in this paragraph wherein the dried catalyst particles comprise at least about 45 wt % of the alumina in the chi and/or gamma phases.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

The invention claimed is:

1. A process for converting heavy hydrocarbon feed into lighter hydrocarbon products comprising:
   providing catalyst particles comprising iron oxide and alumina;
   heat treating said catalyst particles at a temperature between about 150° C. and about 800° C. in air to provide dried catalyst particles comprising no more than about 51 wt % of the alumina in the alpha phase;
   mixing said heavy hydrocarbon feed with hydrogen and said catalyst particles to form a heavy hydrocarbon slurry comprising hydrocarbon liquid and said catalyst particles;
   hydrocracking hydrocarbons in said heavy hydrocarbon slurry in the presence of said hydrogen and said catalyst particles in a hydrocracking reactor to produce a hydrocracked slurry product comprising lighter hydrocarbon products; and withdrawing said hydrocracked slurry product from said hydrocracking reactor.

2. The process of claim 1 wherein said alumina in said catalyst particle comprises less than about 10 wt % water.

3. The process of claim 1 further comprising heat treating said catalyst particles at a temperature between about 150 and about 600° C.

4. The process of claim 1 wherein said alumina in said catalyst particles before heat treating comprise at least about 0.5 wt % diaspore alumina.

5. The process of claim 1 wherein said alumina in said catalyst particles comprise at least about 40 wt % of gibbsite alumina and/or boehmite alumina prior to heat treating.

* * * * *